(12) United States Patent
Martin et al.

(10) Patent No.: US 7,167,689 B2
(45) Date of Patent: Jan. 23, 2007

(54) CRYSTAL FOR A TELEPHONE WATCH

(75) Inventors: Jean-Claude Martin, Neuchâtel (CH); Dominique Dubugnon, Etoy (CH); Jean-Pierre Mignot, Peseux (CH)

(73) Assignee: Asulab S.A., Bienne (CH)

( * ) Notice: Subject to any disclaimer, the term of this patent is extended or adjusted under 35 U.S.C. 154(b) by 457 days.

(21) Appl. No.: 09/767,722

(22) Filed: Jan. 24, 2001

(65) Prior Publication Data

US 2001/0014618 A1    Aug. 16, 2001

(30) Foreign Application Priority Data

Feb. 2, 2000    (CH) .................................. 0200/00

(51) Int. Cl.
*G04B 37/00*    (2006.01)
*G04B 19/24*    (2006.01)
*H04B 1/38*    (2006.01)

(52) U.S. Cl. ...................... 455/90.3; 368/26; 368/294; 368/296

(58) Field of Classification Search ............... 368/13.1, 368/13, 84, 68, 159, 239, 241, 242, 294, 368/296, 314, 321, 26, 69, 224; 455/575.1, 455/90.3, 128, 351, 344
See application file for complete search history.

(56) References Cited

U.S. PATENT DOCUMENTS

| | | | |
|---|---|---|---|
| 4,055,755 A * | 10/1977 | Nakamura et al. ........... 708/111 |
| 4,064,688 A | 12/1977 | Sasaki et al. |
| 4,247,929 A * | 1/1981 | Sasaki et al. .................. 368/69 |
| 4,257,115 A * | 3/1981 | Hatuse et al. .................. 368/69 |
| 5,008,548 A * | 4/1991 | Gat ............................. 250/372 |
| 5,500,835 A * | 3/1996 | Born ............................. 368/11 |
| 5,508,978 A * | 4/1996 | Kalbermatter et al. ......... 368/13 |
| 5,812,498 A * | 9/1998 | Teres ............................ 368/10 |
| 5,883,861 A * | 3/1999 | Moser et al. .................. 368/10 |
| 6,052,339 A * | 4/2000 | Frenkel et al. .............. 368/230 |
| 6,456,569 B1 * | 9/2002 | Stauffer ....................... 368/236 |
| 6,463,011 B1 * | 10/2002 | Christen et al. ............... 368/69 |
| 6,535,461 B1 * | 3/2003 | Karhu .......................... 368/10 |

FOREIGN PATENT DOCUMENTS

| DE | 295 19 714 | 3/1996 |
|---|---|---|
| GB | 2315709 | 11/1998 |

* cited by examiner

*Primary Examiner*—Melody Mehrpour
(74) *Attorney, Agent, or Firm*—Sughrue Mion, PLLC

(57) ABSTRACT

The telephone watch includes a crystal (1) including a keyboard (2) formed in particular of a plurality of capacitive sensors (3) disposed under the crystal. This crystal includes a thick zone (4) at its center and a thinned zone (5) at its periphery. The keyboard (2) is deposited under the thinned zone (5).

7 Claims, 3 Drawing Sheets

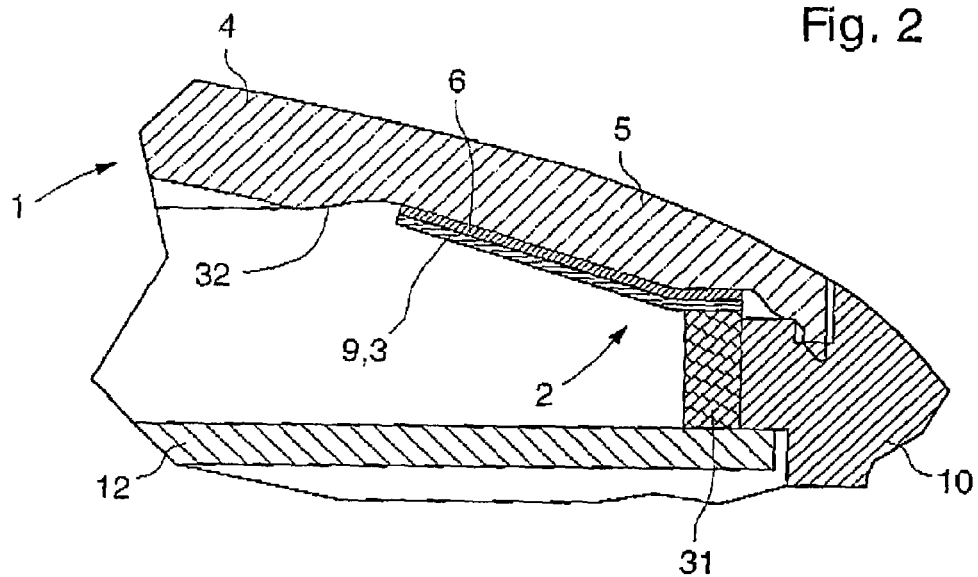
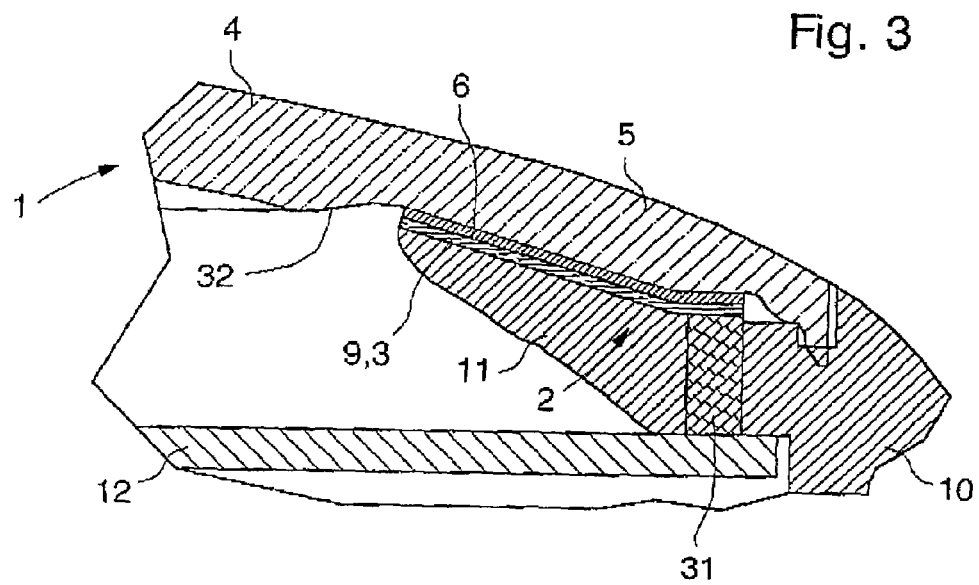

CRYSTAL FOR A TELEPHONE WATCH

BACKGROUND OF THE INVENTION

The present invention relates to a crystal for a telephone watch including a keyboard formed in particular of a plurality of capacitive sensors.

A watch crystal under which there is arranged a keyboard formed of a plurality of capacitive sensors has already been proposed on several occasions. European Patent No. EP 0 674 247 will be taken here by way of example. The watch disclosed includes a case, a crystal and at least one manual control device including a capacitive sensor provided with an electrode disposed on the inner face of the crystal. Selective positioning of a finger of the wearer of the watch on the outer face of the crystal allows a capacitance to be formed between the electrode and earth formed by the watch case. This manual control device also includes a voltage-frequency converter whose oscillation frequency is determined by the aforementioned capacitance. The electrode is connected by a conductor to the converter which is housed in the case.

The keyboard in question may be intended to replace the usual external control means such as push-buttons used to control the various functions of a watch, such as time-setting or starting and stopping a chronograph. It will be understood however that this keyboard may also be used as a selector for dialling a telephone number if the watch is provided with a radio telephone.

The telephone watch which will be discussed hereinafter preferably has a case made of plastic material on which a crystal, also made of plastic material, is mounted. This crystal, which is transparent, allows the hour and minute hands to be seen at its centre and the numbers and signs at its periphery, these numbers and signs serving both as time indices and telephone dial numbers. The plastic crystals of currently known watches generally have a sufficient thickness, on the one hand, to resist shocks from external agents and on the other to bear a certain hydrostatic pressure when the watch is immersed in water. The designer has set himself a limit of 3 bars for such pressure here. It will therefore be understood that these constraints mean that a crystal of sufficiently large thickness has to be used which prevents the proper operation of a keyboard placed under the crystal. Indeed, a thick crystal leads to a significant dielectric interposed between the electrodes of the capacitor formed by the sensor and the user's finger. Thus, the capacitance variation may be low, or even insignificant if the dielectric is large.

SUMMARY OF THE INVENTION

The object of the present invention is therefore to propose a crystal which resists both shocks and pressure while allowing the capacitive sensor placed under it to operate properly.

The crystal of the invention is thus characterised in that it includes a thick zone and a thinned zone, the keyboard being disposed under the thinned zone.

According to a preferred embodiment of the invention, the thick zone is disposed at the centre of the crystal and the thinned zone at the periphery thereof.

BRIEF DESCRIPTION OF THE DRAWING

The features and advantages of the invention will now appear from the following description, made with reference to the annexed drawing and giving by way of explanatory but non-limiting example, two advantageous embodiments of the invention, in such drawing:

FIG. 2 is a partial cross-section of a telephone watch according to a first embodiment of the invention;

FIG. 3 is a partial cross-section of a telephone watch according to a second embodiment of the invention.

BRIEF DESCRIPTION OF THE INVENTION

Figure 1:
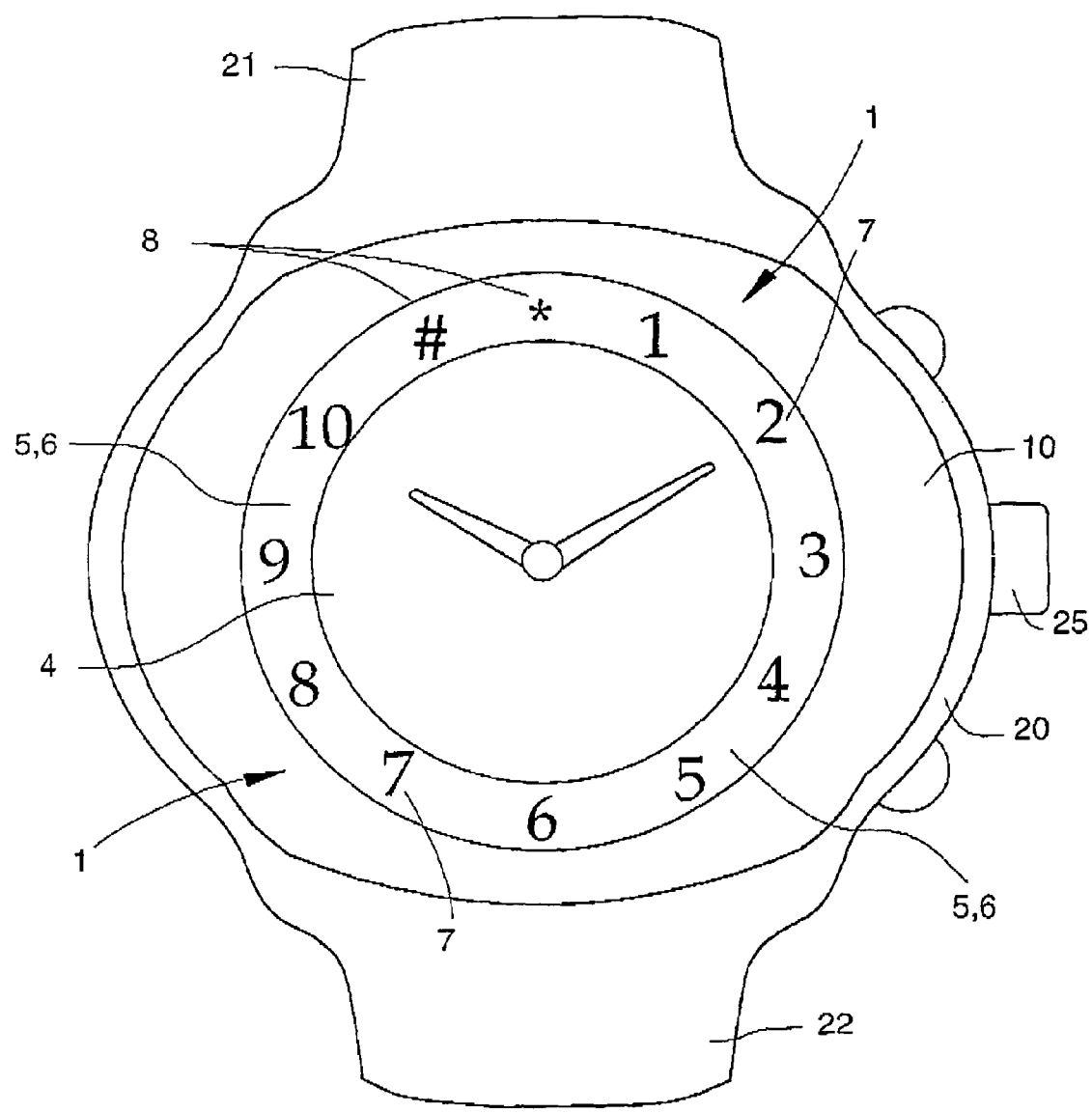
FIG. 1 is a plane view of the telephone watch carrying a crystal made according to the invention.

FIG. 1 is a top view of the telephone watch including the crystal according to the invention. This watch includes a case 20 made of plastic material from which two strands 21 and 22 of a wristband start preferably formed in one piece with the case. A bezel 10 is mounted on the case and a crystal 1 is mounted on the bezel. The watch displays the hours and minutes by means of hands 23 and 24. The time shown by the hands is adjusted by a crown 25.

FIG. 2 is a cross-section made in FIG. 1 and shows a first embodiment of the invention. Crystal 1 includes a keyboard 2 formed in particular of a plurality of capacitive sensors 3 disposed under crystal 1 and which will be described in more detail hereinafter with reference to FIG. 4. According to the invention, crystal 1 includes a thick zone 4 at its center and a thinned zone 5 at its periphery, keyboard 2 being disposed under thinned zone 5.

Thus crystal 1 of the invention is provided with two quite distinct zones. Thick zone 4 is located at the centre of the crystal. This is the zone most exposed to shocks from external agents such as objects encountered when the wearer moves his arm, the edge of a table or a tool for example. This zone may be made to the desired thickness to resist the aforementioned shocks. Thinned zone 5 under which keyboard 2 is disposed is located at the periphery of the crystal where it has been observed that shocks from external agents are less frequent and also less intense. Thus in this zone 5 the thickness of the crystal may be reduced within reasonable limits, one of these limits residing however in the hydrostatic pressure which one wishes the crystal to withstand (the value 3 bars was cited above). As was explained above, the thinning of zone 5 facilitates the proper operation of keyboard 2, since the dielectric interposed between the operator's finger and the capacitive sensors is reduced, which would not be the case if thinned zone 5 was of the same thickness as thick zone 4.

As is seen in FIG. 1, crystal 1 is preferably round, which gives thinned zone 5 a ring shape under which keyboard 2 is arranged.

Figure 4:
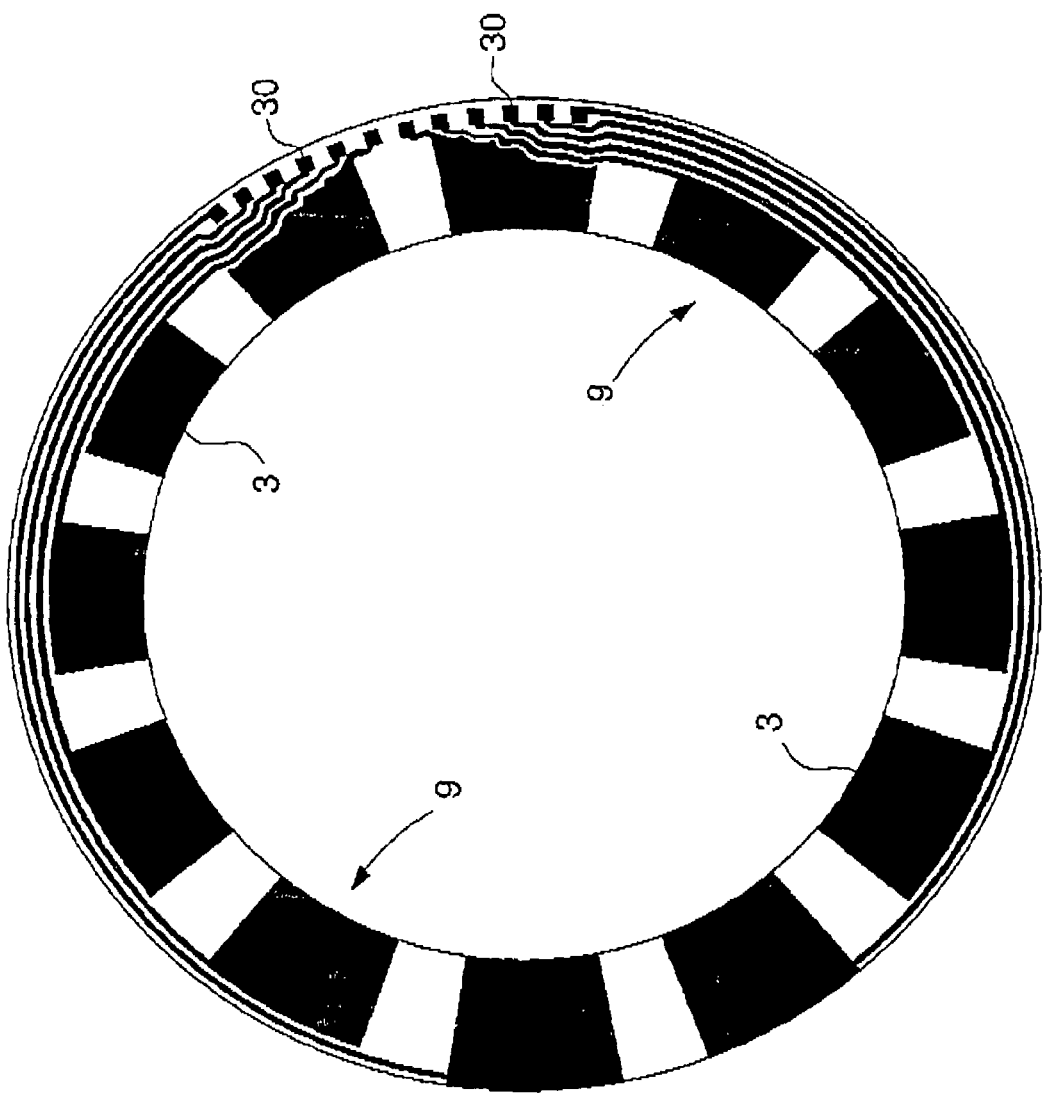
FIG. 4 is a plane view of the capacitive sensors forming the keyboard of the telephone watch.

The way in which keyboard 2 is made will now be specified more precisely. FIGS. 2 and 3 show that keyboard 2 includes a first decorative layer 6. This decorative layer is opaque in order to prevent any of the layer located underneath it, which will be described hereinafter, from appearing. The decorative layer is further composed of numbers 7 from 1 to 10 (or to zero if preferred) and signs 8, namely a star * and a # sign which all appear through crystal 1 in thinned zone 5. It is clear that these numbers and signs serve both as time markings and as telephone dial numbers. A second layer 9 is disposed under first layer 6. This second layer 9 is formed, as FIG. 4 shows, of a plurality of conductive pads 3 (in this case 12 pads). Layers 6 and 9 are oriented and arranged with respect to each other so that there is a conductive pad 3 corresponding to each number 7 or sign 8. As FIG. 4 also shows, conductive pads 3 each have a terminal 30 which allows them to be connected individually, via a "Zebra" connector (trademark) to a printed circuit 12 (see FIGS. 2 and 3).

First and second layers 6 and 9 are disposed one after the other under thinned zone 5 of crystal 1. These depositions are achieved by means known in the art, for example silk screen printing, pad printing or transferring. In order to ensure an easy operation, care will be taken that the bottom face of the thinned zone is free from any asperity or abrupt change of level when one passes from thick zone 4 to thinned zone 5 (see the gradual transition marked by reference 32 in FIGS. 2 and 3).

The second embodiment of the invention is shown in FIG. 3. As is also the case for the first embodiment (FIG. 2), FIG. 3 shows that crystal 1 is secured onto a bezel 10, the securing being achieved, for example by ultrasound means. FIG. 3 also shows that bezel 10 includes an inner reinforcement 11.

This reinforcement 11 extends under thinned zone 5 of crystal 1, in such a way that keyboard 2 is sandwiched between thinned zone 5 and reinforcement 11. The purpose of this reinforcement is to make crystal 1 even more resistant to shocks or pressure.

As a result of this device, one may even further reduce the thickness of thinned zone 5 shown in FIG. 3. The thickness of the dielectric is thus reduced at the same time to consequently increase the signal received by conductive pads 3.

What is claimed is:

1. A crystal for a watch including a keyboard, said crystal comprising an exterior upper face, directed toward the exterior of said watch, and an interior lower face directed toward the interior of said watch, wherein said keyboard includes a plurality of keys, each key being associated with at least one electrode disposed on the lower face of the crystal for forming a plurality of capacitive sensors, said keys being activated by placing a finger on said upper face of the crystal opposite said at least one electrode, wherein said crystal includes a thick zone and a thinned zone, the keys of the keyboard being disposed in only the thinned zone,
   wherein the crystal is secured onto a bezel including an inner reinforcement extending under the thinned zone of the crystal, the keyboard being sandwiched between said thinned zone and said reinforcement, and
   wherein the upper face of the crystal facing the exterior of the watch has a continuous smooth curved surface.

2. A crystal according to claim 1, wherein the thinned zone is arranged on the side of the crystal lower face.

3. A crystal according to claim 1 or 2, wherein the thick zone is disposed at its centre and in that the thinned zone is disposed at its periphery.

4. A crystal according to claim 3, wherein it is round and wherein the thinned zone forms a ring under which the keyboard is deposited.

5. A crystal according to claim 1, wherein the keyboard includes a first decorative opaque layer formed of numbers and signs and deposited directly under the thinned zone, and a second layer deposited under the first and formed of a plurality of conductive pads, a different one of said corresponding pads corresponding to conductive pads corresponding to each number or sign, said conductive pads being individually connected to a printed circuit.

6. A crystal for a watch including a keyboard, said crystal comprising an exterior upper face, directed toward the exterior of said watch, and an interior lower face directed toward the interior of said watch, wherein said keyboard includes a plurality of keys, each key being associated with at least one electrode disposed on the lower face of the crystal for forming a plurality of capacitive sensors, said keys being activated by placing a finger on said upper face of the crystal opposite said at least one electrode, wherein said crystal includes a thick zone and a thinned zone, the keys of the keyboard being disposed in only the thinned zone,
   wherein the upper face of the crystal facing the exterior of the watch has a continuous smooth curved surface, and
   wherein said thick zone has a thickness sufficient to withstand a hydrostatic pressure of three bars.

7. A crystal for a watch including a keyboard, said crystal comprising an exterior upper face, directed toward the exterior of said watch, and an interior lower face directed toward the interior of said watch, wherein said keyboard includes a plurality of keys, each key being associated with at least one electrode disposed on the lower face of the crystal for forming a plurality of capacitive sensors, said keys being activated by placing a finger on said upper face of the crystal opposite said at least one electrode, wherein said crystal includes a thick zone and a thinned zone, the keys of the keyboard being disposed in only the thinned zone,
   wherein the upper face of the crystal facing the exterior of the watch has a continuous smooth curved surface, and
   wherein said thinned zone has a substantially constant thickness.

* * * * *